(12) United States Patent
Ari (10) Patent No.: US 9,249,843 B2
(45) Date of Patent: Feb. 2, 2016

(54) PRESSURE HOLDING TRANSMISSION CLUTCH WITH BALL CHECK VALVE

(71) Applicant: Schaeffler Technologies AG & Co. KG, Herzogenaurach (DE)

(72) Inventor: Vural Ari, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 504 days.

(21) Appl. No.: 13/625,302

(22) Filed: Sep. 24, 2012

(65) Prior Publication Data

US 2013/0075222 A1    Mar. 28, 2013

Related U.S. Application Data

(60) Provisional application No. 61/539,778, filed on Sep. 27, 2011.

(51) Int. Cl.
| | |
|---|---|
| *F16K 1/14* | (2006.01) |
| *F16K 15/04* | (2006.01) |
| *F16D 25/12* | (2006.01) |
| *F16D 48/02* | (2006.01) |
| *F16D 48/06* | (2006.01) |
| *F16D 25/0638* | (2006.01) |

(52) U.S. Cl.
CPC ............... *F16D 25/12* (2013.01); *F16D 48/02* (2013.01); *F16D 48/062* (2013.01); *F16D 25/0638* (2013.01); *F16D 2048/0209* (2013.01); *F16D 2048/0221* (2013.01); *Y10T 137/7837* (2015.04)

(58) Field of Classification Search
CPC ........................................................ F16K 1/14
USPC ......... 192/85.39, 85.29, 92, 101, 85.24, 58.8, 192/85.3, 85.31, 85.27
See application file for complete search history.

(56) References Cited

U.S. PATENT DOCUMENTS

| | | | |
|---|---|---|---|
| 2,568,052 A * | 9/1951 | Catranis .................... 251/285 |
| 3,370,682 A * | 2/1968 | McFarland ................ 192/85.31 |
| 4,325,471 A * | 4/1982 | Schuster .................. 192/85.38 |
| 4,442,929 A | 4/1984 | Uchida | |
| 4,509,627 A | 4/1985 | Kawamoto | |
| 4,907,684 A | 3/1990 | Breisch | |
| 5,259,489 A | 11/1993 | Kimura et al. | |

(Continued)

FOREIGN PATENT DOCUMENTS

| | | |
|---|---|---|
| CN | 101357614 | 2/2009 |
| KR | 2019980053498 | 10/1998 |

*Primary Examiner* — Rodney H Bonck
*Assistant Examiner* — Stacey Fluhart
(74) *Attorney, Agent, or Firm* — Simpson & Simpson, PLLC (57) ABSTRACT

A check valve assembly for a clutch, including: an annular-shaped ring element including a first portion with: a first channel wholly enclosed by the first portion; a first through-bore between a radially inner surface of the first portion and the first channel; and a second through-bore between a radially outer surface of the first portion and the first channel. The assembly includes a first pressure regulating assembly at least partially disposed within the first channel and including: a spool axially displaceable within the first channel and including a space enclosed by the spool; a first ball disposed within the space and the first channel; and a first spring engaged with the spool. The spool is arranged to axially displace in response to hydraulic pressure at the first through-bore and axial force applied by the first spring to displace the first ball to block or unblock flow between the first and second through-bores.

15 Claims, 9 Drawing Sheets

(56) References Cited

U.S. PATENT DOCUMENTS

| | | | |
|---|---|---|---|
| 6,035,989 A * | 3/2000 | Matsuoka | 192/85.32 |
| 6,162,147 A | 12/2000 | Moorman | |
| 6,705,447 B2 | 3/2004 | Gorman et al. | |
| 2011/0315503 A1 | 12/2011 | Ari et al. | |

* cited by examiner

PRESSURE HOLDING TRANSMISSION CLUTCH WITH BALL CHECK VALVE

CROSS-REFERENCE TO RELATED APPLICATIONS

This application claims the benefit under 35 U.S.C. §119(e) of U.S. Provisional Patent Application No. 61/539,778 filed Sep. 27, 2011.

TECHNICAL FIELD

The present disclosure relates to a clutch for a transmission, in particular, a clutch in which pressure in maintained in an apply chamber when the transmission is disengaged from an engine for a vehicle housing the engine and transmission.

BACKGROUND

Vehicles with stop-start functionality provide reduction in fuel consumption. For an automatic transmission, during engine idle stop, the transmission pump stops as well and can no longer supply hydraulic oil pressure to the automatic transmission. When the engine re-starts after an idle stop, the transmission needs to be put in gear quickly in order to prevent vehicle launch delay. Using a conventional automatic transmission, during an engine restart after idle stop, the time required for the pump to energize the transmission, apply the gear, and make the transmission ready for vehicle launch is undesirably long.

U.S. Pat. No. 6,162,147 describes a hydraulic circuit for an automatic transmission operable to reduce time delay in shifting by using a source supplying pressurized fluid through a feed orifice and a charging circuit including an accumulator. Commonly owned U.S. patent application Ser. No. 13/162,888 filed Jun. 17, 2011 teaches use of a sliding spool to block openings and fluid flow in a clutch.

SUMMARY

According to aspects illustrated herein, there is provided a check valve assembly for a clutch, including: an annular-shaped ring element including a first portion with: a first channel wholly enclosed by the first portion; a first through-bore between a radially inner surface of the first portion and the first channel; and a second through-bore between a radially outer surface of the first portion and the first channel. The assembly includes a first pressure regulating assembly at least partially disposed within the first channel and including: a spool axially displaceable within the first channel and including a space enclosed by the spool; a first ball disposed within the space and the first channel; and a first spring engaged with the spool. The spool is arranged to axially displace in response to hydraulic pressure at the first through-bore and axial force applied by the first spring to displace the first ball to block or unblock flow between the first and second through-bores.

According to aspects illustrated herein, there is provided a check valve assembly for a clutch, including: an annular-shaped ring element including a first portion with: first and second channels wholly enclosed by the first portion; first and second through-bores between a radially inner surface of the first portion and the first and second channels, respectively; and a first pressure regulating assembly at least partially disposed within the first channel and including: a spool axially displaceable within the first channel and including a space enclosed by the spool; a first ball disposed within the space and the first channel; and a first spring engaged with the spool. The assembly includes: a second pressure regulating assembly at least partially disposed within the second channel and including: second and third springs; and a second ball engaged with the second and third springs and disposed within the second channel. The spool is arranged to axially displace in response to hydraulic pressure at the first through-bore and axial force applied by the first spring to displace the first ball to block or unblock flow between the first and second through-bores. The second ball is arranged to axially displace in response to hydraulic pressure at the second through-bore and respective axial forces applied by the second and third springs to block or unblock a portion of the second channel.

According to aspects illustrated herein, there is provided a clutch for a transmission, including: an outer housing including a first through-bore; a clutch pack engaged with the outer housing and including at least one clutch plate; a first piston plate; a second piston plate; a snap spring; a first spring; and an annular-shaped ring element including a first portion with: a first channel wholly enclosed by the first portion; and a second through-bore between a radially inner surface of the first portion and the first channel and aligned with the first through-bore. The clutch includes a first pressure regulating assembly at least partially disposed within the first channel and including: a spool axially displaceable within the first channel and including a space enclosed by the spool; a first ball disposed within the space and the first channel; and a first spring engaged with the spool. The spool is arranged to axially displace in response to hydraulic pressure at the first through-bore and axial force applied by the spring to displace the first ball to block or unblock flow between the first and second through-bores.

These and other objects and advantages of the present disclosure will be readily appreciable from the following description of the invention and from the accompanying drawings and claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 11 is a partial cross-sectional view of the clutch shown in FIG. 5 in a third phase of the idle stop mode; and, FIG. 12 is a detail of the first pressure regulating assembly shown in FIG. 3 in the third phase of the idle stop mode.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
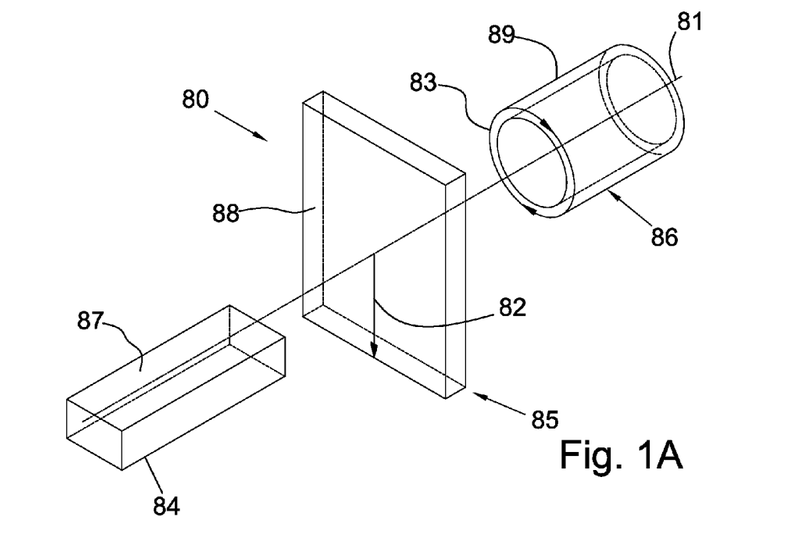
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
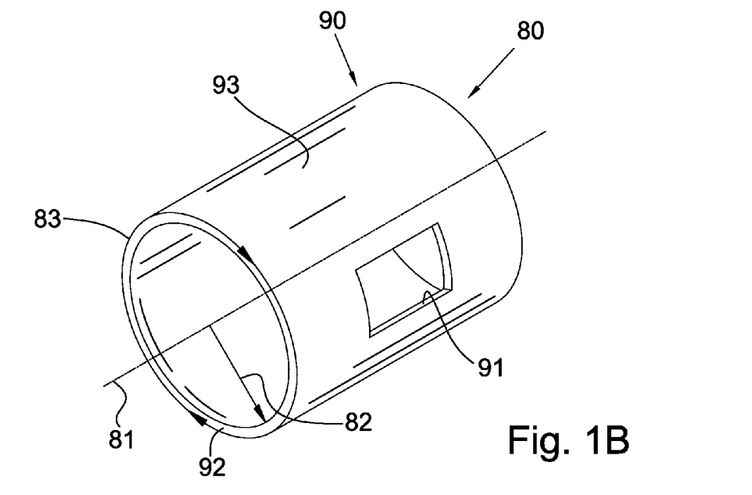
FIG. 1B is a perspective view of an object in the cylindrical coordinate system of FIG. 1A demonstrating spatial terminology used in the present application; and, FIG. 2 is an exploded view of a clutch for a transmission including a check valve assembly.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
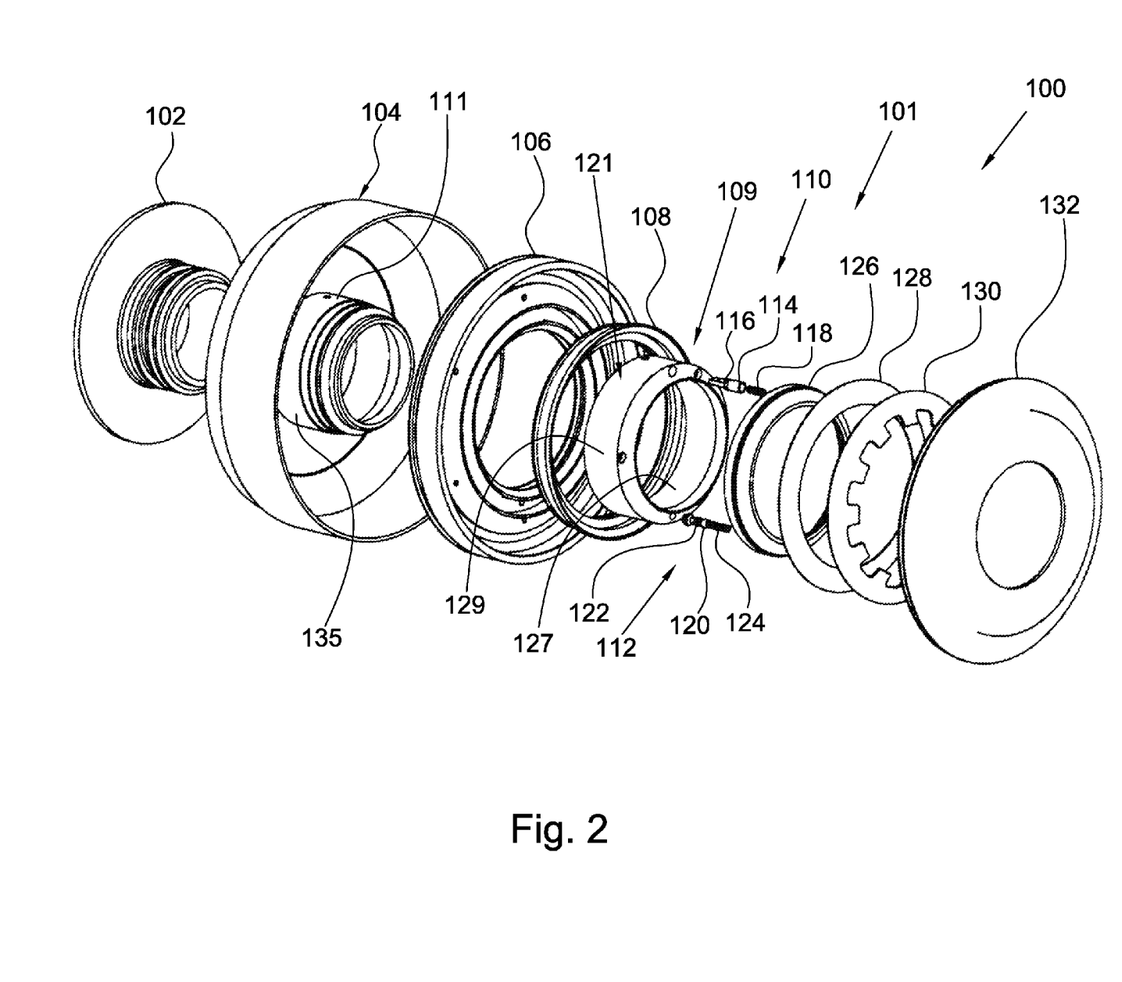

FIG. 2 is an exploded view of clutch 100 with check valve assembly 101.

Figures 3, 4:
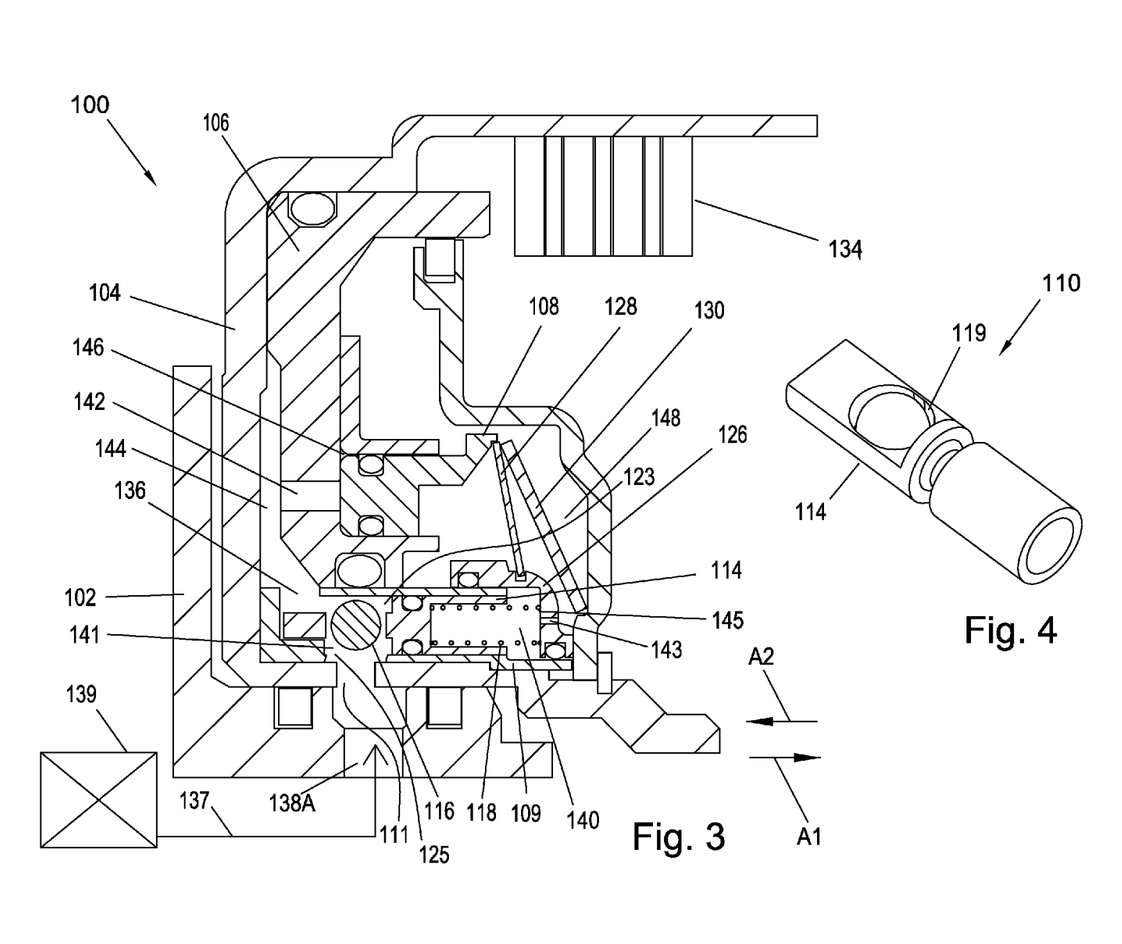
FIG. 3 is a partial cross-sectional view of the clutch shown in FIG. 2 in a clutch disengaged mode showing a first pressure regulating assembly in the check valve assembly.
FIG. 4 is a detail of the pressure regulating assembly shown in FIG. 3.

FIG. 3 is a partial cross-sectional view of clutch 100 shown in FIG. 2 in a clutch disengaged mode showing pressure regulating assembly 110 in check valve assembly 101.

FIG. 4 is a detail of pressure regulating assembly 110 shown in FIG. 3.

Figure 5:
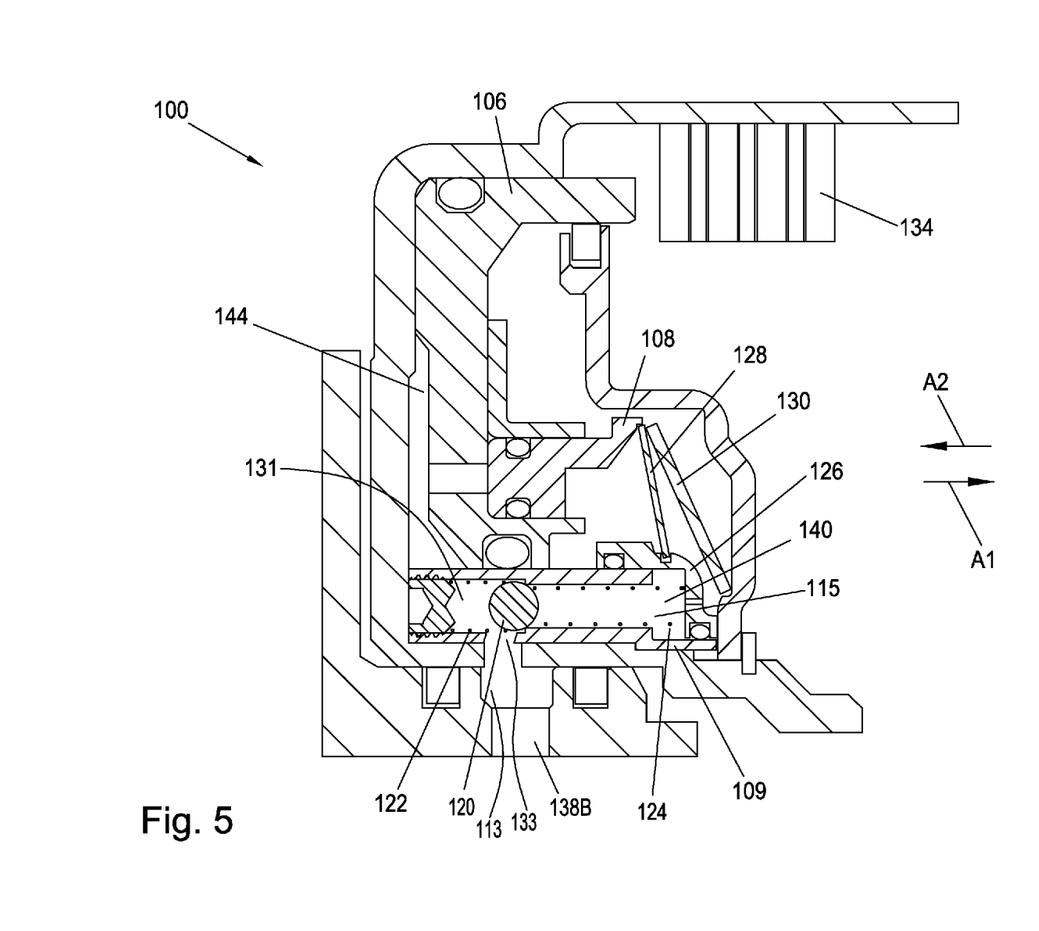
FIG. 5 is a partial cross-sectional view of the clutch shown in FIG. 2 showing a second pressure regulating assembly in the check valve assembly.

FIG. 5 is a partial cross-sectional view of the clutch shown in FIG. 2 showing pressure regulating assembly 112 in check valve assembly 101. The following should be viewed in light of FIGS. 2 through 5. In an example embodiment, clutch 100 is for a transmission. Clutch 100 includes inner housing 102, outer housing 104, piston 106, piston 108, and annular-shaped ring element 109. Assembly 100 includes pressure regulating assembly 110, and pressure regulating assembly 112. In an example embodiment, for example as shown in FIGS. 3 and 4, assembly 110 includes spool 114, ball 116, and spring 118 engaged with the spool. The ball is disposed within space 119 of the spool. In an example embodiment, for example, as shown in FIG. 5, assembly 112 includes ball 120 and springs 122 and 124. Ball 120 is engaged with springs 122 and 124. In an example embodiment, for example as shown in FIGS. 3 and 5, clutch 100 also includes valve piston 126, bi-stable snap spring 128, spring 130, cover 132, and clutch pack 134.

In an example embodiment, the ring element includes portion 121 with channel 123 wholly enclosed by portion 121. The ring element also includes through-bore 125 between radially inner surface 127 of portion 121 and channel 123, and through-bore 136 between radially outer surface 129 of portion 121 and channel 123. In an example embodiment, portion 121 includes channel 131 wholly enclosed by portion 121, and through-bore 133 between the radially inner surface of portion 121 and channel 131. In an example embodiment, assemblies 110 and 112 are at least partially disposed within channels 123 and 131, respectively, in the ring element. In an example embodiment, through-bores 125, 133, and 136 are wholly enclosed by portion 121. That is, the respective sides of the through-bores are formed by portion 121 and openings at the ends of the bores are surrounded by portion 121.

As further described below, in an example embodiment, spool 114 is arranged to axially displace in response to hydraulic pressure at through-bore 125 and axial force applied by spring 118 to displace ball 116 to block or unblock flow through through-bore 125. As further described below, in an example embodiment, ball 120 is arranged to axially displace in response to hydraulic pressure at through-bore 133 and respective axial forces applied by the springs 122 and 124 to block or unblock a portion of channel 131.

In an example embodiment, outer housing 104 includes radially inward portion 135 with through-bore 111 in communication with, for example, aligned with, through-bore 125. Spool 114 is arranged to axially displace in response to hydraulic pressure at through-bore 111 and the axial force applied by spring 118 to displace ball 116 to block or unblock flow through through-bore 111. In an example embodiment, portion 135 includes through-bore 113 in communication with, for example, aligned with, through-bore 133. Ball 120 is arranged to axially displace in response to hydraulic pressure at through-bore 133 and the respective axial forces applied by springs 122 and 124 to block or unblock a portion of the channel 131.

In an example embodiment, housing 102 includes ports 138A and 138B in communication with through-bores 111 and 113, respectively. Chamber 144 is at least partially formed by piston 106 and the outer housing. Fluid can be pumped, as shown by fluid flow 137, to ports 138A and 138B in the inner housing from hydraulic system 139. As described below, assembly 110 controls fluid flow between chamber 144 and port 138A through through-bores 125 and 111. Chamber 140 is at least partly formed by spool 114 and valve piston 126. Channel 142 in piston 106 connects chamber 144 with chamber 146 at least partially formed by pistons 106 and 108. In an example embodiment, the valve piston includes channel 143 passing through wall 145 of the valve piston.

The outer circumference of spring 128 engages piston plate 108 and the inner circumference of spring 128 is fixed with respect to the valve piston. Spring 128 is in a first stable position and urges the valve piston in axial direction A1. Spring 130 exerts a force in axial direction A2. Thus, via spring 128, spring 130 urges the piston plates in axial direction A2. In the clutch disengaged mode, the force exerted by spring 130 is greater than the force exerted by fluid in chamber 144 in axial direction A1, forcing piston plate in direction A2 to open the clutch pack. In the clutch disengaged mode, flow path 137 is clear from system 139 to chamber 144.

In the clutch disengaged mode, element 120 prevents fluid flow between port 138 and opening 115 in portion 121 via chamber 140.

Figure 6:
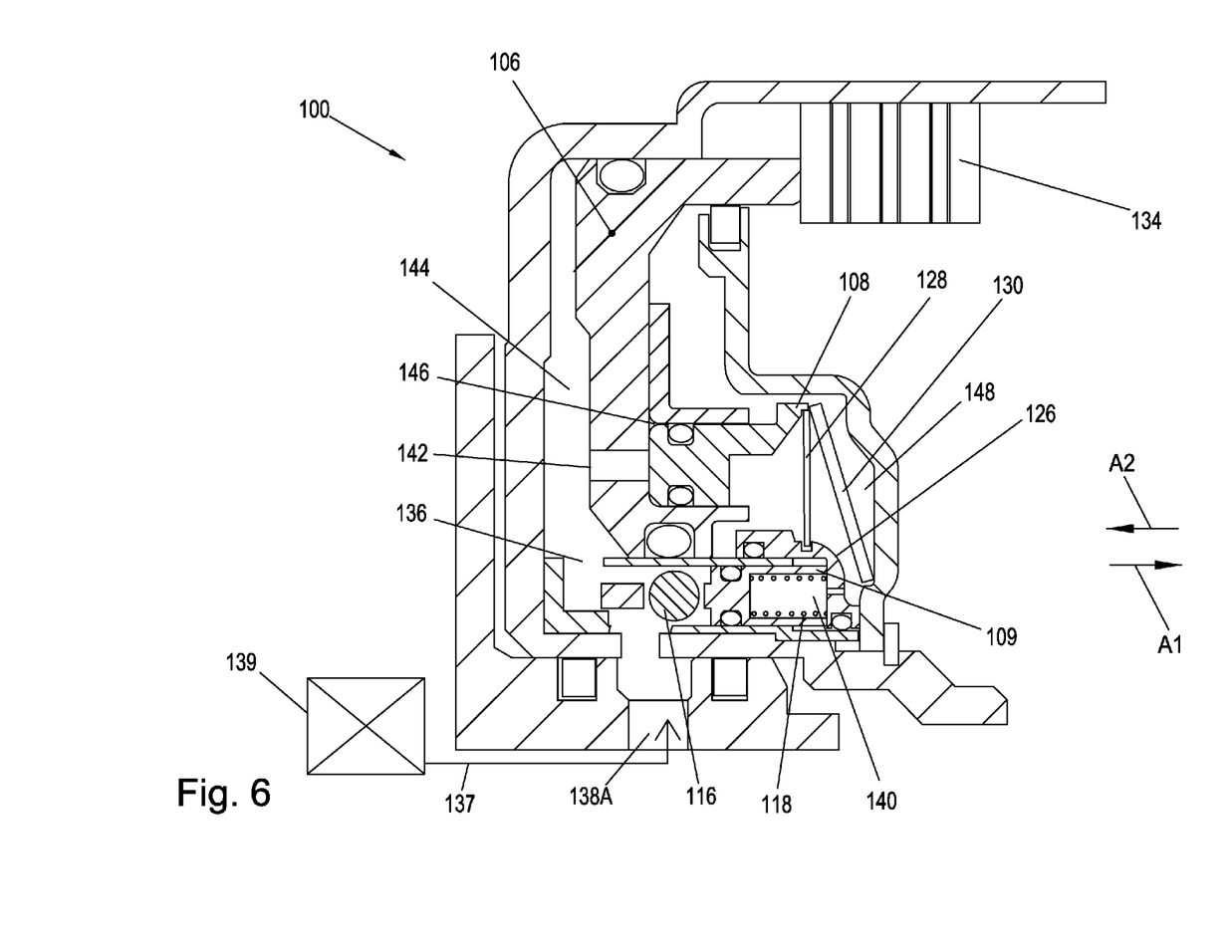
FIG. 6 is a partial cross-sectional view of the clutch shown in FIG. 3 in a clutch engaged mode.
Figure 7:
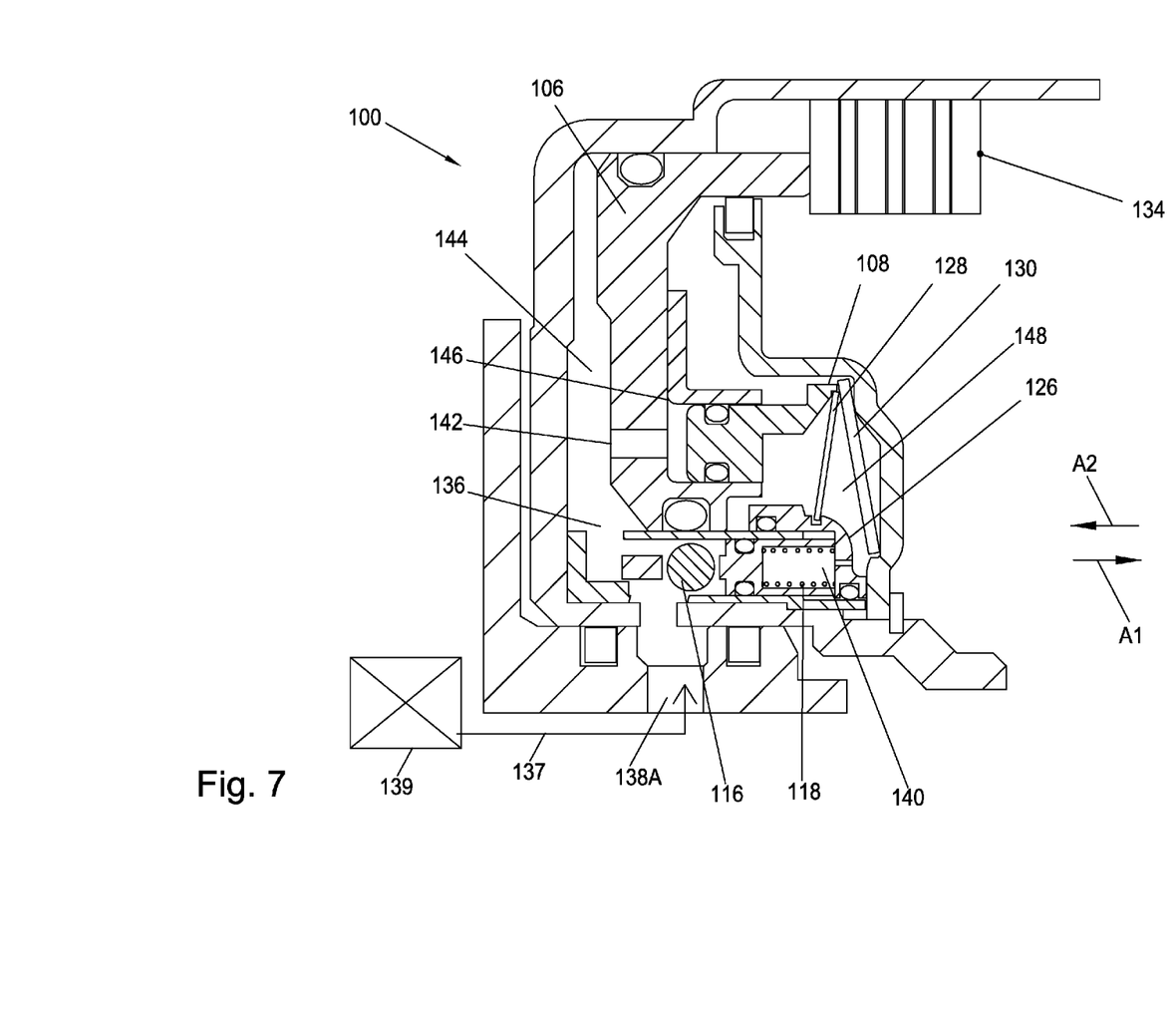
FIG. 7 is a partial cross-sectional view of the clutch shown in FIG. 3 in a first phase of an idle disconnect stop mode.

FIG. 6 is a partial cross-sectional view of clutch 100 shown in FIG. 3 in a clutch engaged mode. In response to an increase in fluid pressure, via flow 137 through port 138, in chamber 144, piston 106 is arranged to displace in direction A1 to move the clutch from the open position of FIGS. 3 and ports 138A and 138B FIG. 7 is a partial cross-sectional view of clutch 100 shown in FIG. 3 in a first phase of an idle stop mode. In the phase shown, fluid pressure at port 138A is increased so that a hydraulic force acting on piston 108 overcomes the force applied by spring 130. Therefore, fluid pressure increases in chambers 144 and 146 and piston plate 108 is arranged to displace in direction A1 to shift the snap spring to a second stable position. In the second stable position, the snap spring urges the valve piston in direction A2 when pressure in chamber 144 is reduced and the snap spring is displaced by spring 130 as described below. Element 120 remains in the blocking position shown in FIG. 5.

Figure 8:
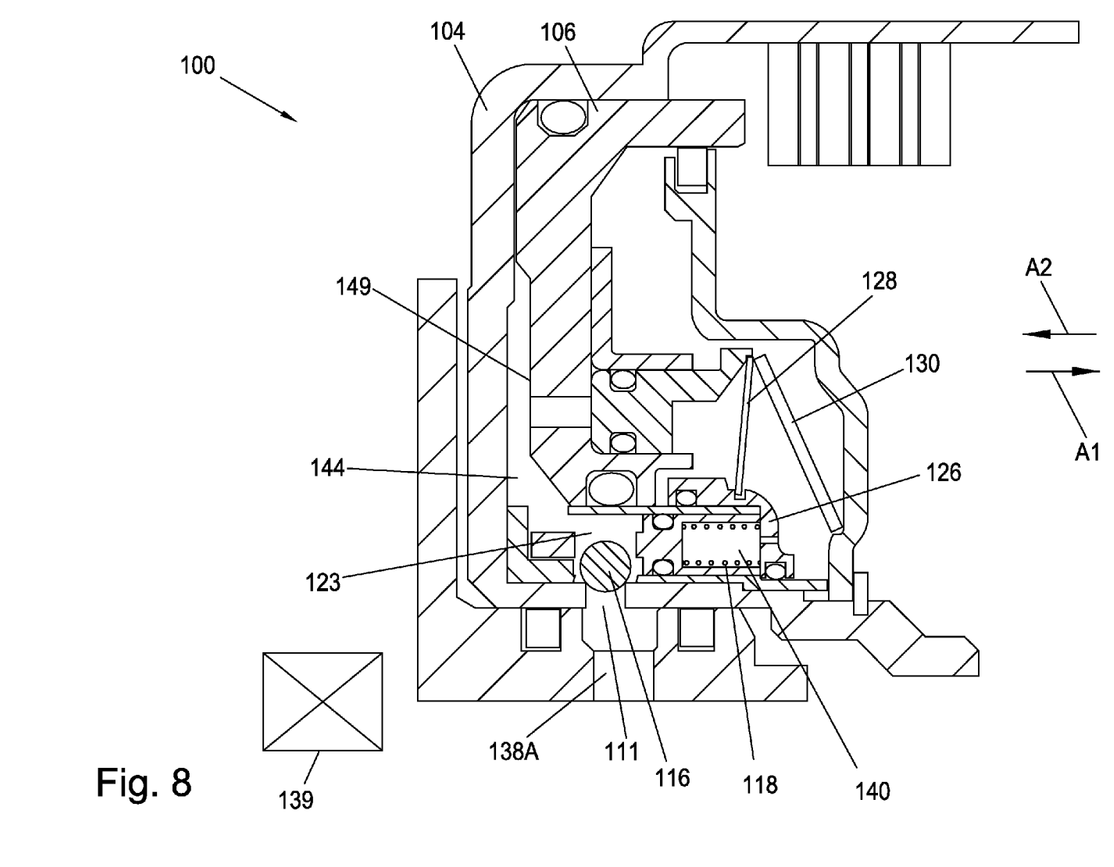
FIG. 8 is a partial cross-sectional view of the clutch shown in FIG. 3 in second phase of the idle stop mode.

FIG. 8 is a partial cross-sectional view of clutch 100 shown in FIG. 3 in a second phase of the idle stop mode. Fluid pressure is decreased at port 138. Blocking element 116 is arranged to displace to block fluid flow between chamber 144 and the port, trapping fluid in chamber 144. For example, element 116 seals against housing 106 at through-bore 111. Spring 130, overcomes pressure in chamber 144 and via contact with the snap spring displaces pistons 108 and 106 to open the clutch. The snap spring displaces assembly 110 in direction A2.

Figures 9, 10:
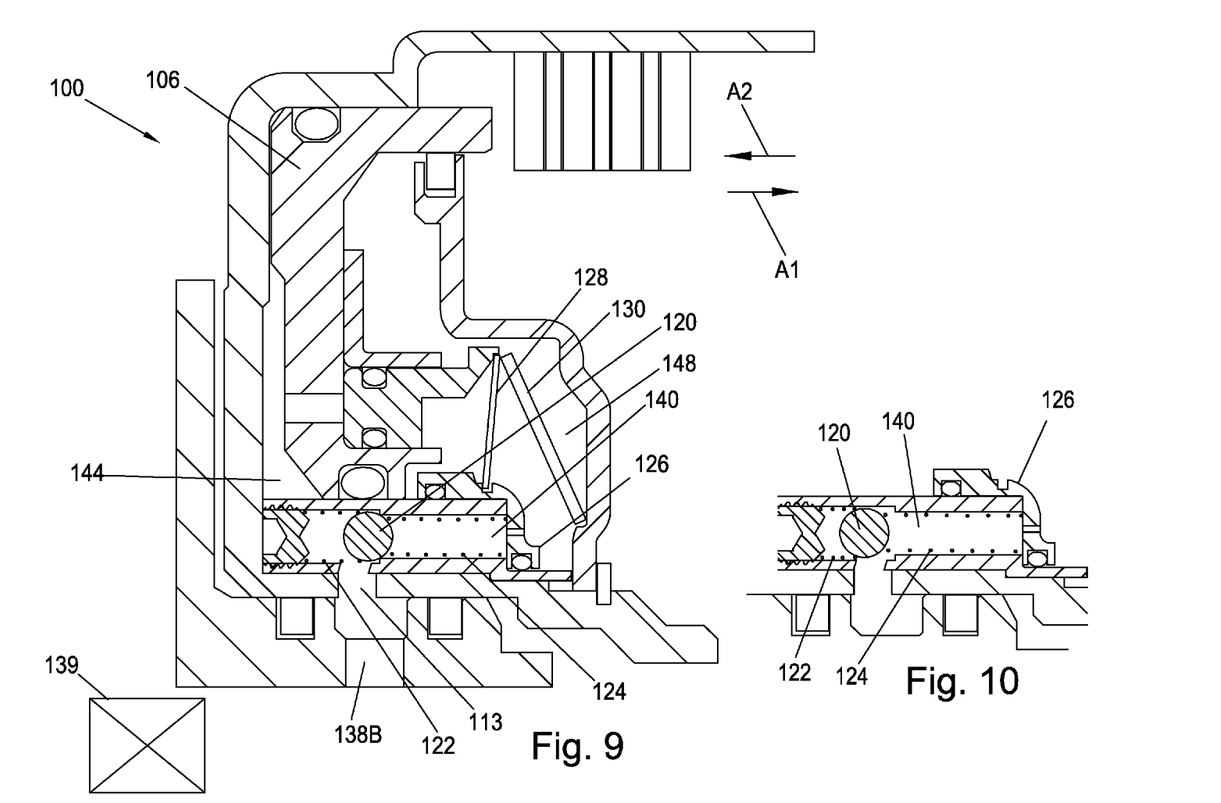
FIG. 9 is a partial cross-sectional view of the clutch shown in FIG. 5 in the second phase of the idle stop mode.
FIG. 10 is a detail of the second pressure regulating assembly shown in FIG. 9.

FIG. 9 is a partial cross-sectional view of clutch 100 shown in FIG. 5 in the second phase of the idle stop mode.

FIG. 10 is a detail of pressure regulating assembly 112 shown in FIG. 9. The following should be viewed in light of FIGS. 9 and 10. As the pressure decreases at port 138, the force from spring 124 displaces element 120 in direction A2, to open a channel from the port to chamber 148, at least partially formed by pistons 106 and 108, to enable fluid flow from the port to chamber 148 during a restart event.

Figures 11, 12:
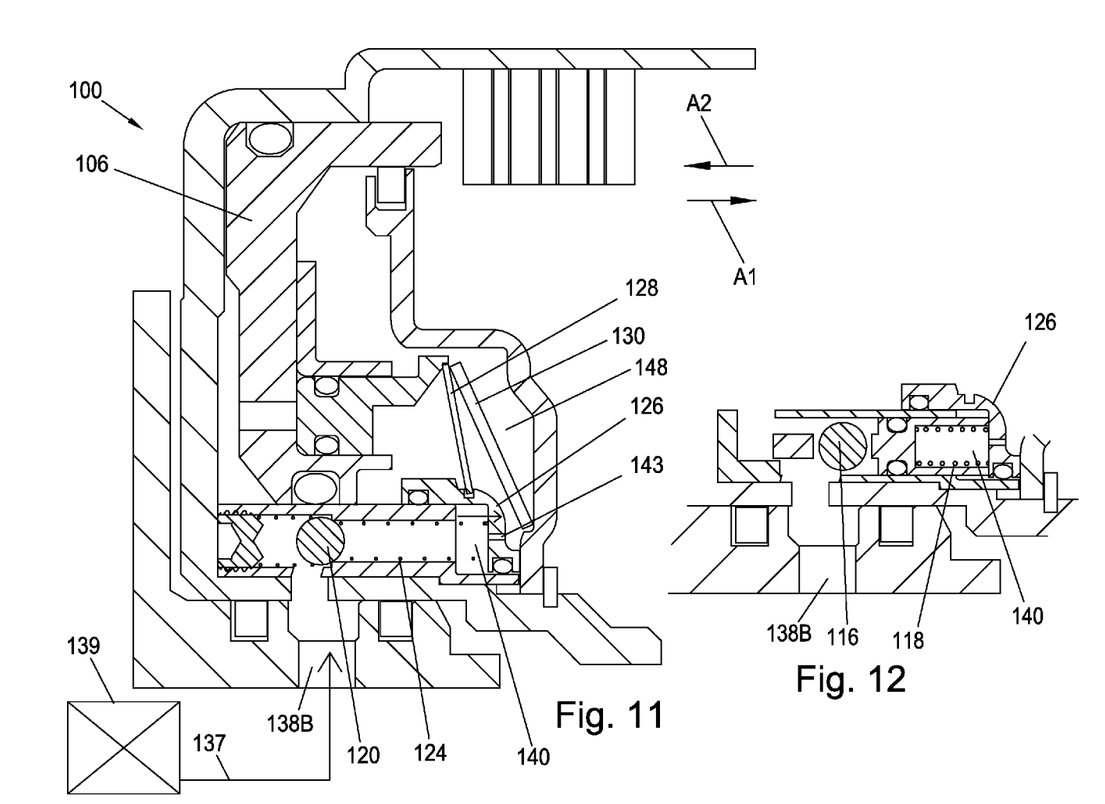

FIG. 11 is a partial cross-sectional view of clutch 100 shown in FIG. 5 in a third phase of the idle stop mode.

FIG. 12 is a detail of the pressure regulating assembly 110 shown in FIG. 3 in the third phase of the idle stop mode. The following should be viewed in light of FIGS. 11 and 12. Fluid pressure is increased at the port. Blocking element 116 is arranged to displace to enable flow from the port to chamber 144. The snap spring is arranged to return to the first stable position in response to the fluid pressure at the port. Blocking element 120 is arranged to displace to block flow from the port to chambers 140 and 148. In an example embodiment, in this phase, the valve piston is arranged to displace to return the snap spring to the first stable position.

In an example embodiment, in the second phase of the idle stop mode, spring 118 is arranged to displace ball 116 to block the fluid flow between chamber 144 and the port, trapping fluid in chamber 144. Spring 122 is arranged to displace ball 120 to open a flow path from the port to chamber 148 via channel 123 and chamber 140.

In an example embodiment, in the second phase of the idle stop mode and in response to the snap spring shifting to the second stable position, ball 116 is arranged to displace to block fluid flow between chamber 144 and the port. In an example embodiment, in the third phase of the idle stop mode, the valve piston is arranged to displace in direction A1 to return the snap spring to the first stable position. Further, blocking element 116 is arranged to displace in response to the displacement of the valve piston, and blocking element 120 is arranged to displace to block flow from the port to chamber 148 in response to the displacement of the valve piston.

The following provides further detail regarding clutch 100. In an example embodiment, mechanically controlled check valve assembly, or mechanism 101 is integrated into the forward clutch of an automatic transmission (not shown), which works together with an engine (not shown) that has the stop-start functionality.

Returning to FIGS. 3 and 4, assembly 101 and clutch 100 are in open mode. Spring 130 holds piston 106 in its complete open position when no pressure acts on piston 106. Typically, spring 130 is preloaded so that a certain amount of force acts on piston 108, and is transferred through spring 128 in this embodiment. The pre-load force of spring 130 is then reacted back to piston 106 via piston 108 so it remains in the open position.

In FIGS. 3 and 4, spool 114 is in open mode where spring 118 is acting between spool 114 and valve piston 126. In open mode, where there is no pressure in port 138A, spring 118 is not compressed and remains in the free state as seen in FIG. 3. Element 116, which is contained within spool 114 is free to move within the contained area, for example, in channel 123. Spool 114 also separates through-bores 111 and 125 from chamber 140.

Returning to FIG. 5, element 120 is in its closed position. Spring 122 ensures that element 120 cannot move into the open position by itself. At this point where there is no pressure in port 138B, spring 124 is not compressed, and spring 124 remains in its free state in contact with element 120. Element 120 also separates port 138B from end 115.

Returning to FIG. 6, clutch 100 is in applied mode where piston 106 clamps the clutch pack during regular operation. In this example, the clutch pack represents a forward clutch which is responsible of applying a first gear of the automatic transmission during vehicle launch. Hydraulics 139 supply pressure through port 138A filling chamber 144 through through-bore 136, and thus exerting an apply force on piston 106. This force moves piston 106 towards the clutch pack and clamps the clutch pack. Channel 142 connects chambers 144 and 146. Therefore, during regular operation when chamber 144 is pressurized, a certain amount of force is exerted on piston 108 as well since pressurized hydraulic oil can enter into chamber 146 through channel 142. However, piston 108 does not move since the force due to the preload of spring 130 is transferred through spring 128 and reacts with piston 108 holding piston 108 tightly against piston 106. As piston 106 moves axially a certain amount of travel is achieved on spring 128 and spring 130 as well. Piston 106 shuttles between the two positions shown in FIGS. 3 and 6 during clutch apply and release modes which happen during the regular operation of the automatic transmission. In this case, both spool 114 and element 116 move axially towards the valve piston, due to the applied hydraulic pressure through port 138A, compressing spring 118 as shown in FIG. 6. Spool 114 stops against valve piston 126. There is no pressure present at chamber 140. Also, element 120 remains in the position shown described in FIG. 5.

Returning to FIG. 7, the vehicle controls call for an idle stop event. Just before the idle stop event, hydraulics 139 supply an increased amount of pressure while piston 106 is still applied. The increase in pressure increases the forces exerted on piston 106 and piston 108. Piston 106 is stopped against the clutch pack; however, the increased force on piston 108 is now high enough to work further against spring 130. As a result, piston 108 moves axially away from piston 106 forcing additional axial travel on springs 128 and 130. The axial travel on spring 128 is far enough to cause bi-stable spring 128 to snap over to its second stable position as shown in FIG. 7. The spool remains stopped against valve piston 126 as described above. Element 120 remains in the same position as described in FIG. 5.

Returning to FIG. 8, the vehicle enters into the idle stop mode shutting down the engine. Since the engine is turned off, hydraulics 139 can no longer supply pressure through port 138A. As a result, apply forces due to the hydraulic pressure no longer act on piston 106 and piston 108. Therefore spring 130 pushes piston 108 back to its original position and reacts on piston 106 moving piston 106 axially to the left as seen in FIG. 8. Spring 128 moves axially back as well, pulling valve piston 126 with it. Spring 128 in this position applies a certain amount of spring force on valve piston 126. Spring 128 moves valve piston 126 axially towards piston 106, therefore pushing on spring 118, which then transmits this force onto the spool. Therefore spool 114 moves axially in the same direction dragging element 116.

The spool is under the influence of both the hydraulic pressure force which acts to move spool 114 and element 116 to the right in the figure, and the spring force due to spring 118, which acts to move spool 114 and element 116 to the left in the figure. Once a desired force balance is achieved spool 114 and element 116 stop at a certain axial position, with element 116 just above port 138A. Since there is no pressure supplied through port 138A, the flow direction is from through-bore 136 to port 138A. Therefore, element 116 is now able to drop into port 138A and block the flow from entering port 138A from through-bore 136, essentially trapping pressure inside chamber 144.

Spring 130 is still pushing on piston 106 with a certain amount of force. This force exerted on piston 106 creates pressure inside chamber 144. This pressure then acts on spool 114 through through-bore 136. If this force is greater than the crack pressure force, which is the holding force of the spring 118, then spool 114 can move axially to the right in the figure and open through-bore 136 to port 138A by removing element 116 from its closed position, therefore allowing flow to pass through port 138A. Below this limit, spool 114 and element 116 stay closed and therefore hydraulic oil is stored in chamber 144 before piston 106 is moved back to the complete open position. Springs 118, 128, and 130 can be designed so that chamber 144 stays closed while piston 106 is either completely disengaged, is close to the touch point relative to the clutch pack, is at the touch point, or is engaged with the clutch. Springs 118, 128, and 130 also determine the amount of pressure that can be held in the closed mode inside chamber 144.

Returning to FIG. 9, the operation of element 120 is also controlled by the pressure and spring reactions. Although hydraulics 139 no longer supply pressure through port 138B during the idle stop mode, there is still pressure in port 138B as long as spool 114 and element 116 are not completely closed as described above, because oil volume is still supplied from chamber 144 back to port 138B. If the force due to the pressure inside chamber 144 is greater than the crack pressure force, then spool 114 can allow flow to pass through and enter port 138B as described above. Since element 120 is also influenced by the pressure in port 138B through through-bore 113, element 120 will continue to stay in its closed position as seen in FIG. 9.

Returning to FIG. 10, when element 116 cuts off chamber 144 from port 138B, the pressure in port 138B drops further. Once a certain minimum pressure is achieved in port 138B, the pressure force acting on element 120 is reduced greatly and the force from spring 124 moves element 120 axially away from valve piston 126 into the open position for element 120, compressing spring 122 and eventually connecting port 138B with chamber 140. This condition enables oil flow to enter into chamber 140 through the cross hole during the re-start event which is described below.

Returning to FIG. 11, a return to normal operating mode is shown. In order to return to this mode, spring 128 must snap back to its original position as shown in FIG. 11. When the vehicle calls for a re-start from the idle stop condition, the engine is re-started and therefore hydraulics 139 are re-energized. This puts regular line pressure back into port 138B. Once port 138B is pressurized, hydraulic oil enters only into chamber 140, since through-bore 136 is blocked by spool 114 and chamber 140 is connected to port 138B through through-bore 113. At the same time, element 120 is out of the way as described in FIG. 10. At this stage, element 120 does not move since there is equal amount of pressure around it and the spring force from spring 124 is still present. The hydraulic oil pressure inside chamber 140 creates an axial force on valve piston 126. Chamber 140 is not sealed and oil can leak through channel, or orifice, 143, relieving pressure in chamber 140. This force in chamber 140 is high enough to move valve piston 126 axially to snap spring 128 back to the original position shown in FIG. 3.

Once valve piston 126 is moved back to its open position, spring 118 is free to move back as well releasing the spring force that acts on spool 114. Spool 114 and element 116 both move to their respective open position due to the influence of the hydraulic pressure in port 138B. Chamber 144 is then re-connected to port 138B and clutch 100 is back to its regular operation mode as seen in FIG. 12. The amount of pressure required to move valve piston 126 can be equal to the pressure that is stored inside chamber 144, so once chamber 144 is re-connected to port 138B, there is no pressure fluctuation due to different pressure zones.

Element 120 also moves axially to its closed position since there is pressure in port 138B and this pressure acts on element 120 through the cross hole as well, as seen in FIG. 11. As valve piston 126 moves axially as described above, spring 124 relaxes reducing the amount of force exerted on element 120. This allows element 120 to move axially towards valve piston 126 far enough to cut-off the cross hole from chamber 140 and therefore preventing any further oil flow into chamber 140. Since chamber 140 is not sealed, any remaining pressure in chamber 140 will decay quickly since oil can leak out through orifice 143. This is the initial normal operating mode and from this point, the pressure in port 138B is increased further to re-apply piston 106 with the clutch pack.

Since hydraulic oil is kept stored inside chamber 144 during the idle stop event, there is no time delay to re-fill chamber 144 once the vehicle calls for a re-start. Moving from the closed to the open mode for spool 114 can be achieved at the same time as pressure is increased to apply the clutch so there is no delay due to this operation as well. This saves time and prevents the delay in the transmission providing a quicker re-start for the automatic transmission that works with an engine that has the stop-start functionality.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. A check valve assembly for a clutch, comprising:
   an annular-shaped ring element including a first portion with:
     a first channel, an entirety of which is located in the first portion;
     a first through-bore between a radially inner surface of the first portion and the first channel; and,
     a second through-bore between a radially outer surface of the first portion and the first channel; and,
   a first pressure regulating assembly at least partially disposed within the first channel and including:
     a spool axially displaceable within the first channel;
     a first ball:
       disposed within the first channel; and,
       including a portion disposed within the spool and displaceable within the spool; and,
     a first spring engaged with the spool, wherein:
       the spool is arranged to axially displace in response to hydraulic pressure at the first through-bore and axial force applied by the first spring to displace the first ball to block or unblock flow between the first and second through-bores.

2. The check valve assembly of claim 1, wherein respective entireties of the first and second through-bores are located in the first portion.

3. The check valve assembly of claim 1, further comprising an outer housing including a radially inward portion with a third through-bore aligned with the first through-bore, wherein the spool is arranged to axially displace in response to hydraulic pressure at the third through-bore and the axial force applied by the spring to displace the first ball to block or unblock the third through-bore.

4. The check valve assembly of claim 1, wherein:
   the first portion includes:
     a second channel, an entirety of which is located in the first portion; and,
     a third through-bore between the radially inner surface of the first portion and the second channel, the check valve assembly further comprising a second pressure regulating assembly at least partially disposed within the second channel and including:
       second and third springs; and,
       a second ball engaged with the second and third springs and disposed within the second channel, wherein the second ball is arranged to axially displace in response to hydraulic pressure at the third through-bore and respective axial forces applied by the second and third springs to block or unblock a portion of the second channel.

5. The check valve assembly of claim 4, wherein an entirety of the third through-bore is located in the first portion.

6. The check valve assembly of claim 4, further comprising an outer housing including a radially inward portion with a fourth through-bore aligned with the third through-bore, wherein the second ball is arranged to axially displace in response to hydraulic pressure at the fourth through-bore and the respective axial forces applied by the second and third springs to block or unblock the portion of the second channel.

7. The check valve assembly of claim 4, wherein:
   the second channel includes an opening at an axial end of the first portion of the annular-shaped ring element;
   in a first phase of an idle stop mode:
     the first ball is positioned to enable flow between the first and second through-bores; and,
     the second ball is positioned to block flow from the third through-bore through the second channel to the opening; and,
   in a second phase of the idle stop mode:
     the spool is arranged to displace the first ball to block flow between the first and second through-bores; and,
     the second ball is arranged to displace to enable flow from the fourth through-bore through the second channel to the opening.

8. A check valve assembly for a clutch, comprising:
   an annular-shaped ring element including a first portion with:
     first and second channels;
     first and second through-bores between a radially inner surface of the first portion and the first and second channels, respectively;
   a first pressure regulating assembly at least partially disposed within the first channel and including:
     a spool axially displaceable within the first channel and including a space enclosed by the spool;
     a first ball disposed within the space and the first channel; and,
     a first spring engaged with the spool; and,
   a second pressure regulating assembly at least partially disposed within the second channel and including:
     second and third springs; and,
     a second ball engaged with the second and third springs and disposed within the second channel, wherein:
       respective entireties of the first and second channels are located in the first portion;
       the spool is arranged to axially displace in response to hydraulic pressure at the first through-bore and axial force applied by the first spring to displace the first ball to block or unblock flow between the first and second through-bores; and,
       the second ball is arranged to axially displace in response to hydraulic pressure at the second through-bore and respective axial forces applied by the second and third springs to block or unblock a portion of the second channel.

9. A clutch for a transmission, comprising:
   an outer housing including a first through-bore;
   a clutch pack engaged with the outer housing and including at least one clutch plate;
   a first piston plate;
   a second piston plate;
   a snap spring;
   a first spring;
   an annular-shaped ring element including a first portion with:
     a first channel, an entirety of which is located in the first portion; and,
     a second through-bore between a radially inner surface of the first portion and the first channel and aligned with the first through-bore; and, a first pressure regulating assembly at least partially disposed within the first channel and including:
  a spool axially displaceable within the first channel;
  a first ball:
    disposed within the first channel; and,
    including a portion disposed within the spool, wherein:
  the first spring is engaged with the spool; and,
  the spool is arranged to axially displace in response to hydraulic pressure at the first through-bore and axial force applied by the spring to displace the first ball to block or unblock flow through the second through-bore.

10. The clutch of claim 9, wherein the annular-shaped ring element includes a third through-bore between the first channel and a radially outer surface of the first portion.

11. The clutch of claim 10, wherein respective entireties of the second and third through-bores are located in the first portion.

12. The clutch of claim 9, wherein
the outer housing includes a third through-bore;
the first portion of the annular-shaped ring element includes:
  a second channel, an entirety of which is located in the first portion of the annular-shaped ring element; and,
  a fourth through-bore between the radially inner segment of the first portion and the second channel and aligned with the third through-bore,
the check valve assembly further comprising a second pressure regulating assembly at least partially disposed within the second channel and including:
  second and third springs; and,
    a second ball engaged with the second and third springs and disposed within the second channel, wherein the second ball is arranged to axially displace in response to hydraulic pressure at the third through-bore and respective axial forces applied by the second and third springs to block or unblock a portion of the second channel.

13. The clutch of claim 12, wherein an entirety of the fourth through-bore is located in the first portion.

14. The clutch of claim 12, further comprising an inner housing with:
  a first segment located radially inward of the annular-shaped ring element; and,
  a port open to the first and third through-bores, wherein:
    the spool is arranged to axially displace in response to hydraulic pressure at the port and the axial force applied by the spring to displace the first ball to block or unblock flow between the first and second through-bores; and,
    the second ball is arranged to axially displace in response to hydraulic pressure at the port and the respective axial force applied by the second and third springs to block or unblock the portion of the second channel.

15. The clutch of claim 12, wherein:
the second channel includes an opening through an axial end of the first segment of the annular-shaped ring element;
in a first phase of an idle stop mode:
  the first ball is positioned to enable flow through the second through-bore; and,
  the second ball is positioned to block flow from the fourth through-bore through the second channel to the opening; and,
in a second phase of the idle stop mode:
  the spool is arranged to displace the first ball to block flow between the first and second through-bores; and,
  the second ball is arranged to displace to enable flow from the fourth through-bore through the second channel to the opening.

\* \* \* \* \*